United States Patent
Burek et al.

[19]

[11] Patent Number: 6,011,218
[45] Date of Patent: Jan. 4, 2000

[54] U-SHAPED UNIVERSAL GROUNDING CLAMP

[75] Inventors: Denis E. Burek, Cumming; Marc D. Jones; William H. Small, both of Lithonia, all of Ga.

[73] Assignee: Lucent Technologies, Inc., Murray Hill, N.J.

[21] Appl. No.: 08/862,086

[22] Filed: May 22, 1997

Related U.S. Application Data

[63] Continuation-in-part of application No. 08/530,809, Sep. 20, 1995, abandoned.

[51] Int. Cl.$^7$ ........................................... H02G 7/00
[52] U.S. Cl. ..................... 174/40 CC; 174/51; 174/135; 439/98
[58] Field of Search ............................... 174/135, 40 CC, 174/84 C, 51; 24/135 N; 439/98, 100, 811, 812; 385/134, 136, 137

[56] References Cited

U.S. PATENT DOCUMENTS

| | | | |
|---|---|---|---|
| 1,679,677 | 8/1928 | Milne | 439/100 |
| 1,991,075 | 2/1935 | Bloomquist | 439/811 |
| 2,551,636 | 5/1951 | Ratigan | 279/112 |
| 3,259,347 | 7/1966 | Yates | 248/73 |
| 3,544,955 | 12/1970 | Ruiz | 439/792 |
| 3,802,654 | 4/1974 | Jenko et al. | 248/73 |
| 3,829,825 | 8/1974 | Hawkins | 439/798 |
| 4,844,575 | 7/1989 | Kinard et al. | 350/96.23 |
| 4,909,592 | 3/1990 | Arroyo et al. | 350/96.23 |
| 5,004,437 | 4/1991 | Walter et al. | 439/811 |
| 5,125,063 | 6/1992 | Panuska et all | 385/133 |
| 5,440,666 | 8/1995 | Burek et al. | 385/135 |

FOREIGN PATENT DOCUMENTS

| | | | |
|---|---|---|---|
| 1359290 | 3/1964 | France | 439/811 |

*Primary Examiner*—Kristine Kincaid
*Assistant Examiner*—Dhiru R Patel
*Attorney, Agent, or Firm*—Thomas, Kayden, Horstemeyer & Risley, L.L.P.

[57] ABSTRACT

A U-shaped universal ground assembly with oversheath protection for use in grounding a cable, the grounding clip having a ground 'block' including a framework with a generally open end and a spaced closed end. The framework includes a pair of bifurcated leg members extending from the open end of the framework toward the closed end thereof. An arcuate toothed portion is formed as a lower grip member at the closed end of the framework, and an opposed upper grip member, slidably positioned on the framework, is adapted to be moved toward the closed end of the framework. The grounding block also includes a wire retainer pivotally and slidably supported on the open end of the framework and adapted to be moved into a generally closed position across the open end of the framework. At least one ground wire opening is defined in the framework, and at least one ground wire opening is defined in the wire retainer in substantial registry therewith.

20 Claims, 14 Drawing Sheets

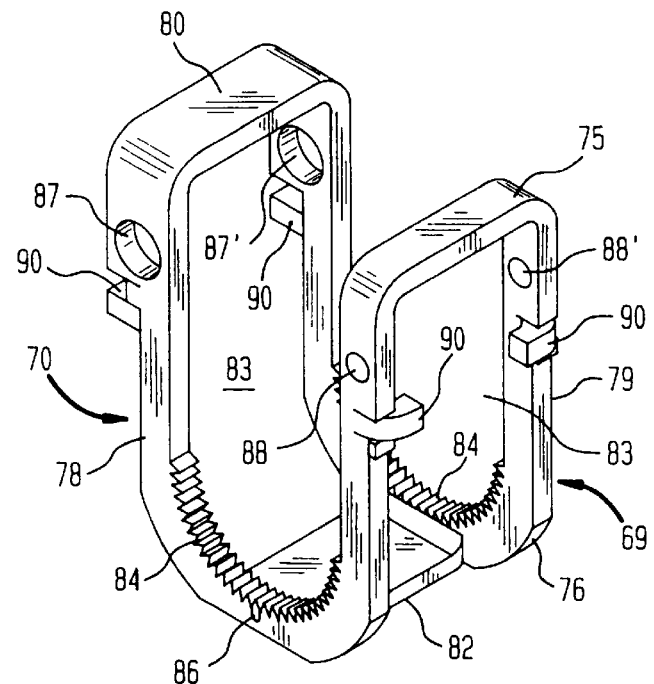
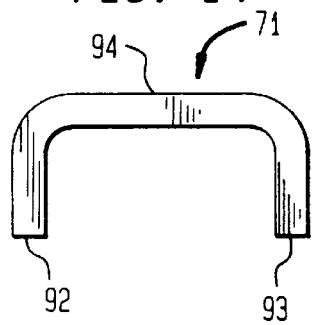
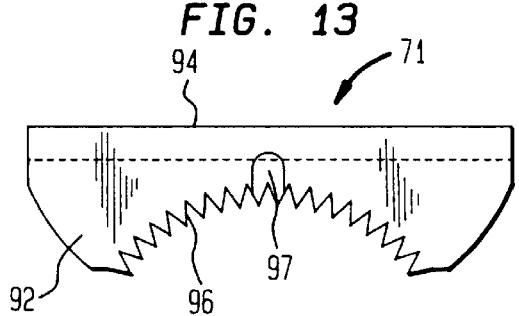
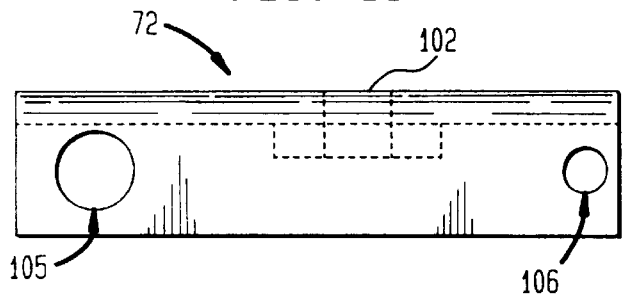
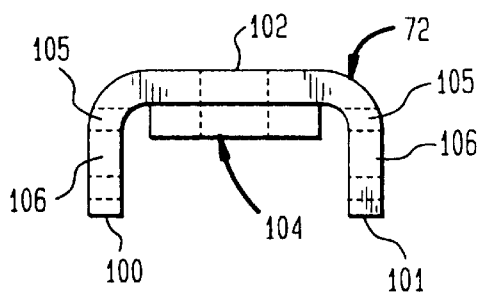

U-SHAPED UNIVERSAL GROUNDING CLAMP

CROSS REFERENCE TO RELATED APPLICATION

This application is a continuation-in-part of application Ser. No. 530,809, filed Sep. 20, 1995, now abandoned and incorporated herein by reference.

FIELD OF THE INVENTION

This invention relates in general to electrical grounding clips. More particularly, this invention relates to a simplified universal grounding clip for use in electrically grounding optical fiber cable, or other types of cable, having metallic components as members.

BACKGROUND OF THE INVENTION

Optical fibers continue to play an ever increasing and important role in communications signal transmission, and are steadily replacing traditional electrical signal transmission means such as coaxial cable and twisted pairs. Optical fibers offer the advantages of a large signal bandwidth coupled with a relatively small size and light weight. These advantages, however, carry with them certain problems inherent in the nature of the optical fiber cable itself For example, the optical fibers used in the cables are primarily made of glass or other low ductility materials and are mechanically fragile, being characterized by a low strain fracture point, especially in tensile loading. As a result, therefore, cable structures have been developed for mechanically protecting the optical fibers in various environments, to include outside installation and cable pulling operations.

One of the structures developed to protect optical fibers has been the inclusion of strength members in the cable. The strength members are not involved in signal transmission, but are instead used to limit the strain on the optical fibers and to carry the load of the optical fiber cable where, for example, the cable is suspended above ground or is being pulled off of a cable reel.

In U.S. Pat. No. 4,844,575 of Kinard et al., there is shown a lightweight optical fiber cable which includes a sheath system having two strength members made of a metallic material diametrically opposed on each side of a cable central core formed from a tubular plastic jacket, in which the optical fibers are carried. The strength members extend longitudinally along and are parallel to the cable axis. The strength members are enclosed in the cable by the plastic jacket, being sufficiently coupled with the jacket to provide a composite cable arrangement with a predetermined relative tensile and compressive stiffness capable of withstanding the expected compressive and tensile loadings.

In U.S. Pat. No. 5,125,063 of Panuska et al., a lightweight optical fiber cable is shown having at least one bundle of optical fibers disposed within a tubular member forming a cable central core enclosed by a sheath system, the sheath system including two elongated longitudinal strength members extending along the axial length of the cable. The sheath system disclosed in Panuska et al, also includes a metallic armor layer which encloses a waterblocking tape for increased tensile and compressive stiffness, as well as, for protection of the optical fiber cable from damage.

An inherent problem in the use of metallic strength members, however, arises when the cable is struck by lightning so that an unexpected and decidedly unwanted electrical charge travels along one or both of the strength members forming a part of the cable. Moreover, a lighting strike may also penetrate the cable jacket and bum through to a metallic oversheath and/or the metallic sheath of the cable, transmitting electricity along the length of the cable until the electrical current is either dissipated by grounding, or is otherwise shorted out. It is also possible that due to ambient conditions, the cable may hold a static electrical charge in either of the strength elements or the metallic sheath(s). Grounding the cable is thus necessary in order to prevent damage to people and property from stray and unexpected electrical current passing through the mechanical components of the cable, or from any static charges in the cable.

As a consequence, optical fiber cable is routinely grounded every time it is spliced, and especially where the cable enters into a commercial or residential structure. This is accomplished through the use of conventional bonding and grounding hardware known to those skilled in the art.

In the known bonding and grounding hardware a sealing clamp is passed over the outside of the cable and the plastic cable jacket is then cut and opened to leave a portion of the metallic sheath and the metallic strength members exposed. The metallic strength members are then bent at an angle of approximately 90° from the longitudinal axis of the cable, and the base section of the grounding block is placed over the cable. The bent portions of the metallic strength members fit within notches formed in the base of the grounding block, and the sealing clamp is slid over the base of the grounding block and tightened to secure the grounding block to the cable. Any excess portion of the metallic members protruding beyond the base of the grounding block is then cut. A bond shoe is then slid between the corrugated metal sheath and the tubular member of the optical fiber cable until a threaded bond shoe stud positioned on the bond shoe lies against the end of the metallic sheath, the bond shoe stud being generally aligned with the grounding block. A bond plate is then placed over the bond shoe, so that the bond shoe stud extends upward from the bond shoe and is passed through an opening in the bond plate. A second opening in the bond plate is aligned with a corresponding opening formed in the grounding block so that a threaded fastener can be passed therethrough and into a bonding block which acts to secure the grounding block, the bond shoe, and the bond plate to the optical fiber cable. Thereafter, a ground wire, or ground wires, provided by a cable installer or splicer is placed into the bonding block and secured thereto by set screws, thus grounding the cable.

Although this known type of bonding and grounding hardware can satisfactorily function as grounding means for a cable, from the foregoing it can be seen that it has a large number of individual parts susceptible to being lost or misplaced at the job site, and it is equally apparent that it also takes a great deal of time and effort to perform the required steps to assemble this hardware. In as much as this operation is performed several hundreds of thousands of times per year by cable splicers and technicians, generally working in crowded spaces, the amount of time required to install the known grounding hardware is quite significant. It thus follows, as with any other labor intensive operation, that the labor costs incurred to perform this work are equally as significant a factor when measuring the costs to perform cable grounding operations. Thus a savings of time of even only a few minutes per installation will result in a very significant cost savings over the course of a year.

What is needed and is not seemingly available in the art is an improved, ie. simplified, universal grounding clip which requires little on-site assembly, and which is quickly and easily used to minimize the time needed, and thus labor costs, to ground the metallic strength elements and/or metallic sheaths of a cable. Desirably, such a grounding clip should have relatively few components or parts to minimize the material costs of the grounding clip, as well as the labor costs of handling and installing the grounding clip not to mention minimizing the possible loss of parts.

SUMMARY OF THE INVENTION

The present invention is an improved U-shaped three piece universal ground assembly, including oversheath protection, which overcome some of the design deficiencies of other grounding clips known in the art. The invention is a partially pre-assembled grounding clip having a grounding block sized and shaped to be passed over an optical fiber cable and to receive the cable therein, a pair of opposed generally arcuate and toothed grip members positioned on the grounding block for gripping the optical fiber cable, each of the grip members being adapted to both move into physical and electrical engagement with the cable in the grounding block for the purposes of electrically grounding the cable. As the grip members are moved into engagement with the strength elements, and or the metallic sheath or oversheath of the cable, a separately provided ground wire is simultaneously fastened to the grounding block, and the cable is thus grounded.

In accordance with the invention, the grounding block comprises a substantially U-shaped member having a generally open end and an opposed closed end adapted to receive the cable therein. Each of the legs of the U-shaped member is bifurcated, and the legs themselves are spaced apart and generally parallel to each other. The closed end of the U-shaped member has a plurality of longitudinally extending inwardly facing teeth or serrations for gripping the cable to be grounded and for making contact with the armored sheath of the cable. Approximately centrally located in the toothed arcuate section thus formed is a longitudinally extending notch for receiving a strength member of the cable, as described hereinbefore.

A movable grip member having a toothed arcuate section opposed to the toothed arcuate section of the block is slidably mounted in the block and guided by the bifuircated legs of the U-shaped member. The movable grip member is movable toward the fixed arcuate section of the block by means of a clamping screw threadably mounted in a retainer member located between the bifurcated legs and spanning the opening between the legs of the U-shaped member. The screw is adapted to bear against the grip member and to drive it into contact with a cable mounted in the grounding clip assembly. The retainer member has at least one ground wire receiving opening therein which is substantially in registry with ground wire openings in at least one of the bifurcated legs. When a cable to be grounded is inserted in the clip and the ground wire of the cable inserted into the ground wire receiving holes, the action of the screw in forcing the movable grip members into contact with the cable causes the retainer member to move sufficiently in the opposite direction to cause the ground wire hole therein to move out of register with the holes in the legs, thereby pinching the ground wire and forcibly retaining it within the assembly.

In a second embodiment of the invention, the framework of the grounding block again includes a generally open end and an opposed closed end, having also a first bifurcated leg member and a second bifurcated leg member, wherein each of the bifurcated leg members includes an arcuate toothed portion formed as a lower grip member at the closed end of the framework, and an opposed arcuate toothed upper grip member is slidably mounted within the bifurcations. Spaced from the open end of the framework is a plurality of notched support stops formed one each in each of the bifurcated leg members, the notch support stops being sized and shaped to support a wire retainer positioned within the framework thereon. A clamping screw is threadably received within the wire retainer and passed therethrough toward the upper grip member, the clamping screw being adapted to bear on the upper grip member for moving it toward the second end of the framework to grip the cable placed within the grounding block.

As with the first embodiment of this invention, in the second aspect of the invention a ground wire opening is formed in at least one of the bifurcated legs of the framework, and at least one ground wire opening in register therewith is formed in the wire retainer so that a ground wire can be passed through the ground wire openings, the wire retainer being sized and shaped to react in the direction opposite to the direction of the movement of the clamping screw when the upper grip member engages the cable received within the framework thus to fasten the ground wire to the framework for electrically grounding both the cable and the grounding block simultaneously.

The third embodiment of this invention is substantially similar to the first embodiment of this invention, with the following structural additions. The closed end of the U-shaped member has a longitudinally extended knurled tongue portion with a ridge at the end of the knurled tongue portion extending above and below the knurled tongue portion. The bottom ridge acts as a clamp stop and the top ridge acts a grip for the cable. On the closed end of the U-shaped member, side opposite the longitudinally extended knurled tongue portion, is at least one longitudinally extended post (i.e. strength member(s) wrap posts) for directing a strength member of the cable away from the optical fibers to prevent damage. The retainer member has a strength element with a "L" shaped slot opening. When the strength member(s) is inserted in the slot opening and moved to the back of the "L" shaped slot to inhibit movement of the support member, the action of a set screw pinches the strength member(s) into contact with the back of the slot and attaches the strength member(s) to the assembly.

The present invention provides a simple, efficient, and time saving device and method for quickly and efficiently grounding a cable without the need to assemble a grounding clip assembly from a plurality of loose parts at the job site.

The features and advantages of the present invention will be more readily apparent from the following detailed description read in conjunction with the accompanying drawings.

DESCRIPTION OF THE DRAWINGS

FIG. 10 is a perspective view of a second embodiment of the U-Shaped universal ground assembly of the invention.

FIG. 11 is front elevational view of the universal ground assembly of FIG. 10.

FIG. 12 is a perspective view of the grounding block of the universal ground assembly illustrated in FIG. 10.

FIG. 13 is a side elevational view of the upper grip member of the universal ground assembly illustrated in FIG. 10.

FIG. 14 is an end view of the upper grip member of FIG. 13.

FIG. 15 is an end view of the wire retainer of the universal ground assembly shown in FIG. 10.

FIG. 16 is a side elevational view of the wire retainer illustrated in FIG. 15.

DETAILED DESCRIPTION

Figure 1A:
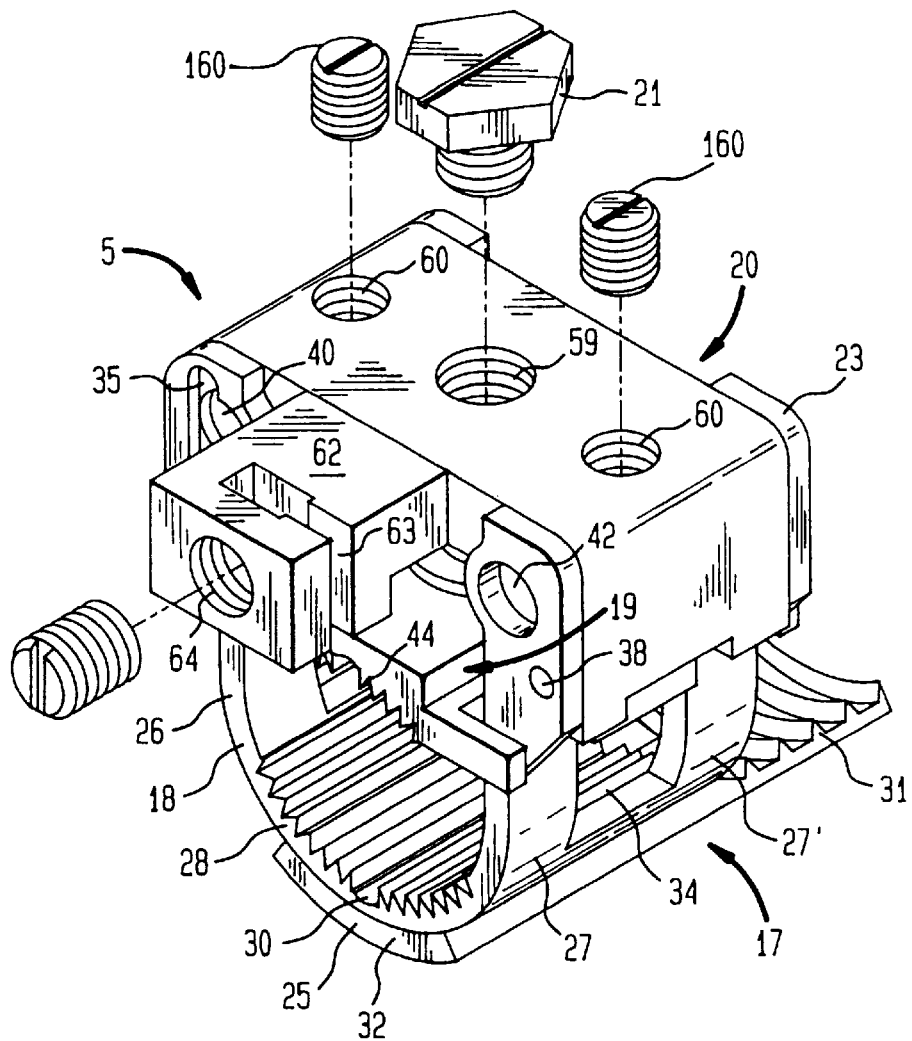
FIG. 1A is a perspective view of a first embodiment of the U-Shaped universal ground assembly with oversheath protection, showing the wire retainer in its closed position.
Figure 1B:
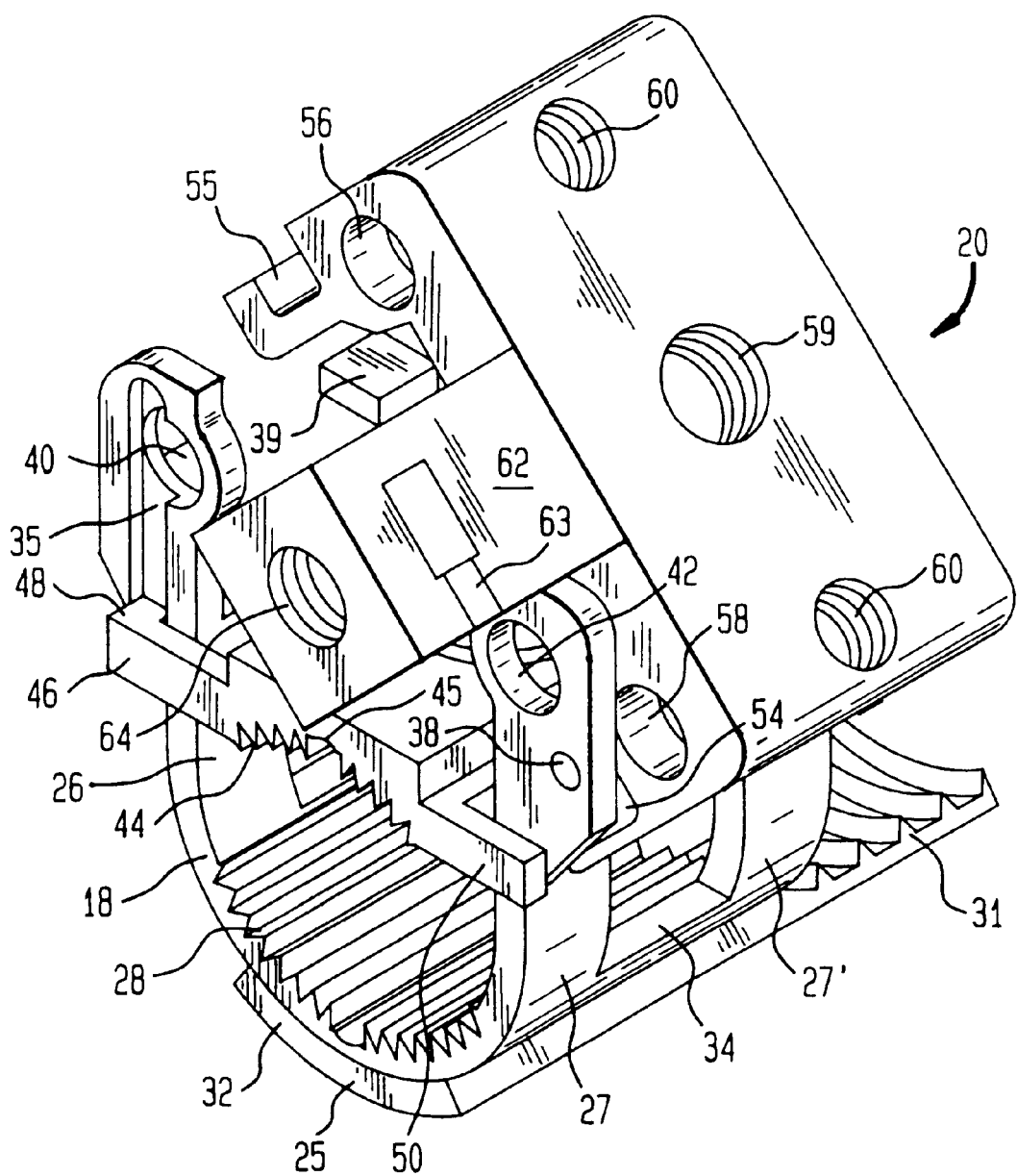
FIG. 1B is a perspective view of the universal ground assembly of FIG. 1A with the wire retainer shown in an open position.

Referring now in detail to the drawings, in which like reference numerals indicate like parts throughout the several views, numeral 5 of FIG. 1 refers to a preferred embodiment of the U-shaped three piece universal ground assembly with oversheath protection. Universal ground assembly 5, as shown in FIG. 1A, is used to provide an electrical ground for optical fiber cable 7, illustrated in FIG. 2.

Figure 2:
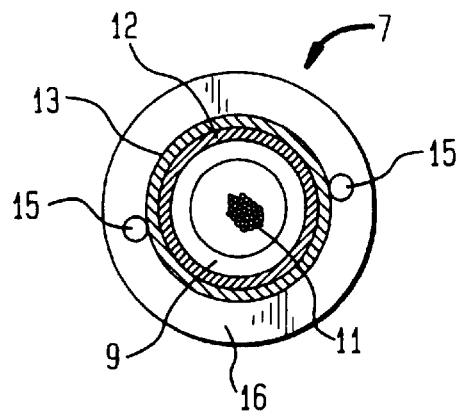
FIG. 2 is a cross section view of an optical fiber cable.

Referring to FIG. 2, optical fiber cable 7 which is a typical configuration, has a central core formed from a tubular member 9 which encloses a plurality of loose optical fiber bundles 11. A sheath 12 encloses tubular member 9 and extends along the axial length of cable 7. Sheath 12 may include a suitable waterblocking tape having an overlapped seam along its length, such an arrangement being disclosed in U.S. Pat. No. 4,909,592 of Arroyo et al., issued on Mar. 20, 1990. A metallic oversheath 13 encloses sheath 12 along the axial length of optical fiber cable 7. Oversheath 13 is provided for additional rodent protection in those applications where the cable may be susceptible to rodent attack, and provides an additional layer of resistance against penetration into tubular member 9 so that optical fiber bundles 11 are not otherwise damaged or destroyed.

A sheath arrangement similar to that disclosed herein, without the inclusion of oversheath 13, is disclosed in U.S. Pat. No. 4,844,575 to Kinard et al., issued on Jul. 4, 1989. Both sheath 12 and oversheath 13 may be made of any metallic material, including steel, stainless steel, bronze, copper, bimetal, aluminum, or any other metallic substance. In addition, both the internal and external sides of sheath 12 and oversheath 13 may be coated with a material such as an acrylic acid copolymer for protection against corrosion and to prevent each of the sheaths from becoming bonded to the other and to tubular member 9 of the cable.

Optical fiber cable 7 includes a pair of generally opposed strength elements 15, as illustrated in FIG. 2, which are positioned diametrically opposite one another along the axial length of the cable. Strength elements 15 will generally be made of either metallic wires, glass, or ceramic rods, and will have both the tensile strength and compressive stiffness needed to support the cable adequately while it is being pulled off of a cable support reel, as well as supporting the cable in those instances, for example, in which it is strung on overhead lines between spaced support poles. Generally, however, strength elements 15 are made of a metallic wire, and thus the present need for electrically grounding the cable.

The last element of optical fiber cable 7 is a cable jacket 16 which encloses all of the components of the cable. Cable jacket 16 is generally made of a suitable insulating material, this material generally being a plastic material.

Referring now to FIG. 1A, universal ground assembly 5 includes a grounding block 17 which comprises a U-shaped framework 18 with an upper grip member 19 positioned thereon, a wire retainer 20 positioned on the framework, and a clamping screw 21 threadably received within the wire retainer 20 and adapted to bear on upper grip member 19.

Figure 3:
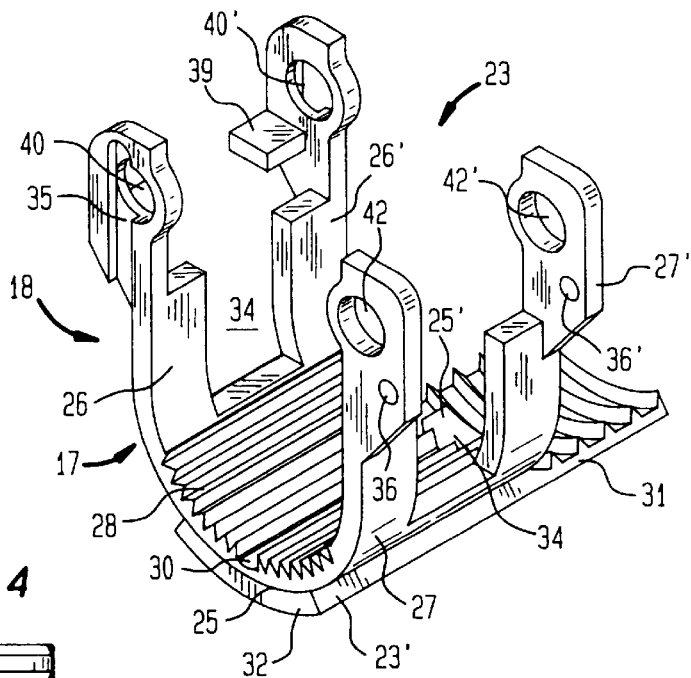
FIG. 3 is a perspective view of the grounding block of the universal ground assembly illustrated in FIG. 1.
Figure 4:
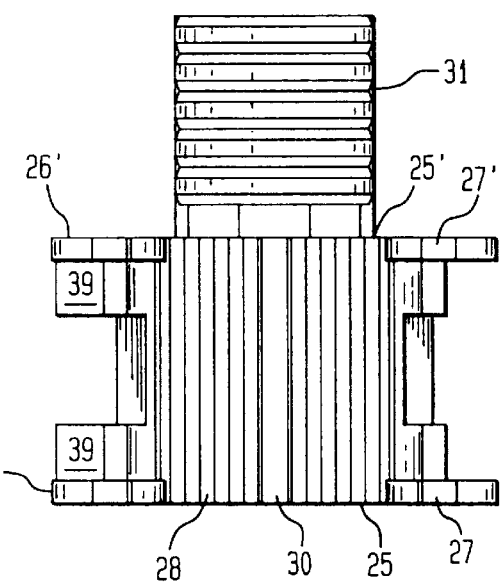
FIG. 4 is a top plan view of the grounding block illustrated in FIG. 3.
Figure 5:
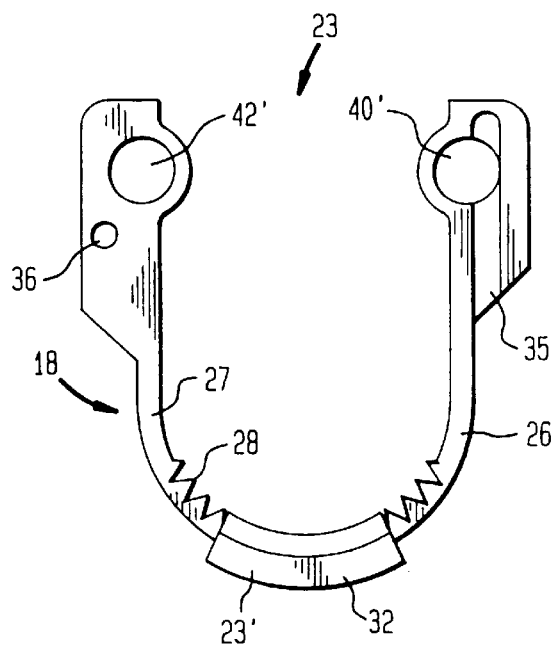
FIG. 5 is rear elevational of the grounding block illustrated in FIG. 3.

As best illustrated in FIGS. 3, and 5, framework 18 includes a generally open side 23 and a spaced apart and generally closed side 23'. Framework 18 also has a first end 25, and a spaced second end 25' (FIGS. 3 and 4). The framework includes a first bifurcated leg member 26 and a second bifurcated leg member 27, each of said bifurcated leg members having a first leg (26 & 27) and a second leg (26' & 27') separated by the bifurcation. Each of the bifurcated leg members are spaced apart and generally parallel to one another. The bifurcations of the legs form openings or slots 34 on each side of leg portion of the generally U-shaped frame member 18.

Referring now to FIG. 3, closed side 23' of the framework 18 includes an arcuate toothed portion 28, i.e. a lower grip member, in the closed end of the U-shape which extends along the axial length of framework 18, the axial length of framework 18 being defined by an axial line extending parallel to cable 7 (FIG. 10), once received within grounding block 17, and extending from first end 25 to second end 25' of framework 18. A notched portion 30 extends axially along the center of arcuate toothed portion 28, notched portion 30 being adapted to receive one of strength elements 15 of the cable.

As best shown in FIGS. 3 and 4, framework 18 includes a stepped cable grip 31 which is adapted to grip the exterior cable jacket 16 of the cable. If optical fiber cable 7 includes both sheath 12 and oversheath 13, cable jacket 16 will be stripped so that oversheath 13 will rest on stepped cable grip 31 for the purposes of grounding oversheath 13, while sheath 12 will be received within arcuate toothed portion 28, with strength element 15 lying along and within notched portion 30. Prior to the placement of universal ground assembly 5 on optical fiber cable 7, a cable or hose clamp (shown as item 157 in FIG. 23), of the type known to those skilled in the art, is passed over the end of the cable and positioned about the cable and over stepped cable grip 31 so that as the hose clamp is tightened, grounding block 17 is rigidly fastened to the cable. As best shown in FIGS. 1A, 3 and 4, stepped cable grip 31 is formed as a part of a reinforcing ridge 32 which extends along the length of framework 18, and adds additional structural rigidity to the framework.

Referring again to FIG. 3, framework 18 includes a pair of opposed and elongated slotted openings 34 formed by the bifurcated legs of the leg members within the framework intermediate open side 23 and close side 23' thereof. Slotted openings 34 are provided as a guide for upper grip member 19, discussed in greater detail below.

Figure 6:
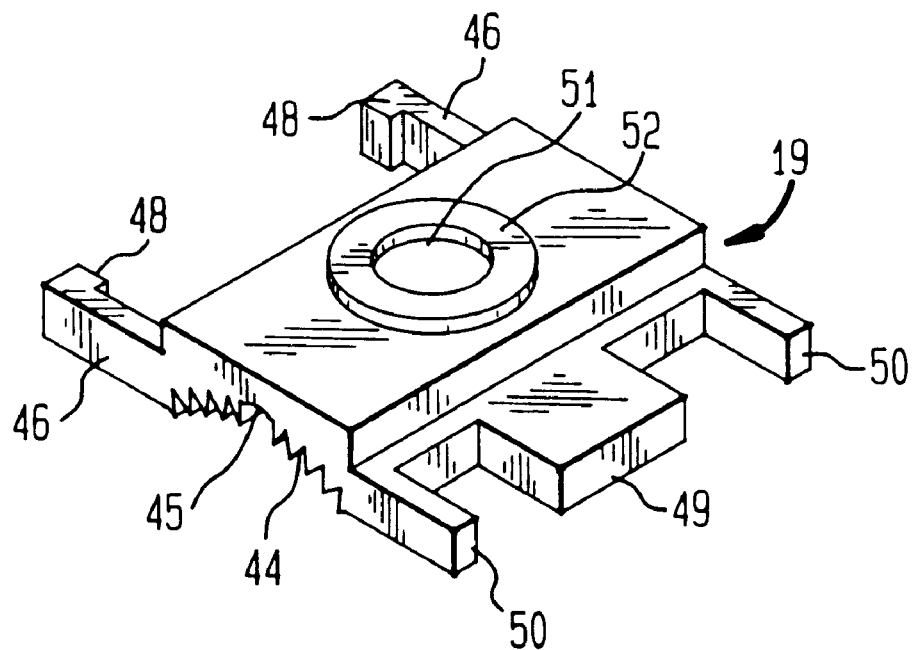
FIG. 6 is a perspective view of the upper grip member of the universal ground assembly illustrated in FIG. 1.
Figure 7:
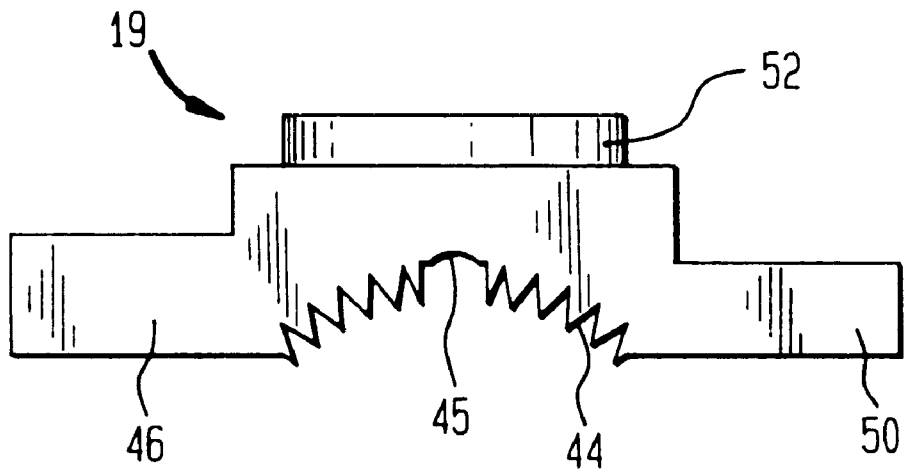
FIG. 7 is a side elevational view of the upper grip member illustrated in FIG. 6.

Referring to FIGS. 3 and 5, framework 18 has a pair of slotted guides 35 formed one each in each of the two legs of first bifurcated leg member 26, at the open side 23 of the framework. Slotted guides 35 are formed so that they are opposed and generally parallel to one another, and open away from each other outward of framework 18. In second bifurcated leg member 27, at the open side of framework 18, a pin opening 36 is defined for receiving a pin 38 (FIG. 1). Pin 38 acts to connect wire retainer 20 pivotally to framework 18. Framework 18 includes a pair of opposed wire retainer lugs 39, one being formed on the inside of each of the two legs of first bifurcated leg member 26. Both wire retainer lugs 39 face inward toward each other. As shown in FIGS. 3, 4 and 20–23, wire retainer lugs 39 are formed on first bifurcated leg member 26, on which slotted guides 35 are also formed, opposite pin openings 36 and pin 38 formed and supported, respectively, in second bifurcated leg member 27. Framework 18 has a first pair of aligned ground wire openings 40 and 40' formed in first bifurcated leg member 26, and a second pair of aligned ground wire openings 42 and 42' formed in second bifurcated leg member 27. Referring to FIG. 6, upper grip member 19 is illustrated in perspective view. Upper grip member 19 has an arcuate toothed portion 44 adapted to grip optical fiber cable 7 within grounding block 17. Arcuate toothed portion 44 is generally a mirrored opposite of arcuate toothed portion 28 of framework 18. Accordingly, arcuate toothed portion 44 includes a centrally notched portion 45 extending along the length of the grip member. Notched portion 45 is adapted to receive one of strength elements 15 for the purpose of grounding not only sheath 12, but of also grounding one of strength elements 15 within grounding block 17.

Still referring to FIG. 6, upper grip member 19 has a pair of spaced fingers 46 extending from one side thereof, both of fingers 46 being generally parallel to one another and extending outwardly from the upper grip member. Formed at the end of each of fingers 46 is a projection 48 which extends laterally with respect to the length of finger 46, each of projections 48 extending toward the other. So sized and shaped, fingers 46 and projections 48 are adapted to pass within slotted guides 35 as upper grip member 19 is moved along the outside of framework 18 during which time arcuate toothed portion 44 is also facing upward. Once projections 48 are moved to the top of slotted guides 35, upper grip member 19 is pivoted across open side 23 of framework 18, so that arcuate toothed portion 44 faces toward the closed side 23' of framework 18, so that arcuate toothed portion 44 faces toward the closed side 23' of framework 18 with framework 18 being held between each of fingers 46 and projections 48 as upper grip member 19 moves along the inside of the framework toward closed side 23'.

A center guide 49 is formed at the end of upper grip member 19 opposite fingers 46. Center guide 49 is sized and shaped to ride within slotted opening 34 formed in second bifurcated leg member 27, as illustrated in FIG. 1. Similarly, a pair of edge guides 50 are provided, each of edge guides 50 riding on the outside of second bifurcated leg member 27. Also provided as a part of upper grip member 19 is a clamping screw bearing pad 51, having a generally circular and raised collar 52 for capturing the free end of clamping screw 21 once it is threaded through wire retainer 20.

Figure 8:
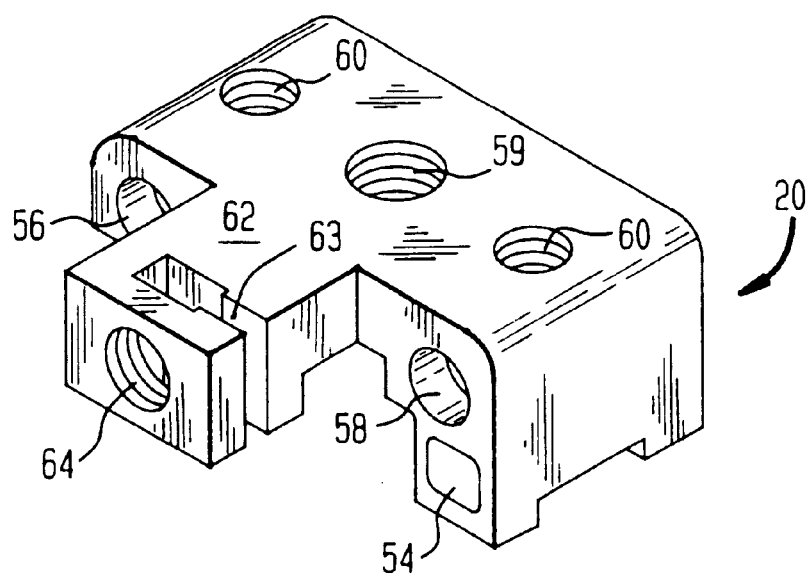
FIG. 8 is a perspective view of the wire retainer of the universal ground assembly illustrated in FIG. 1.
Figure 9:
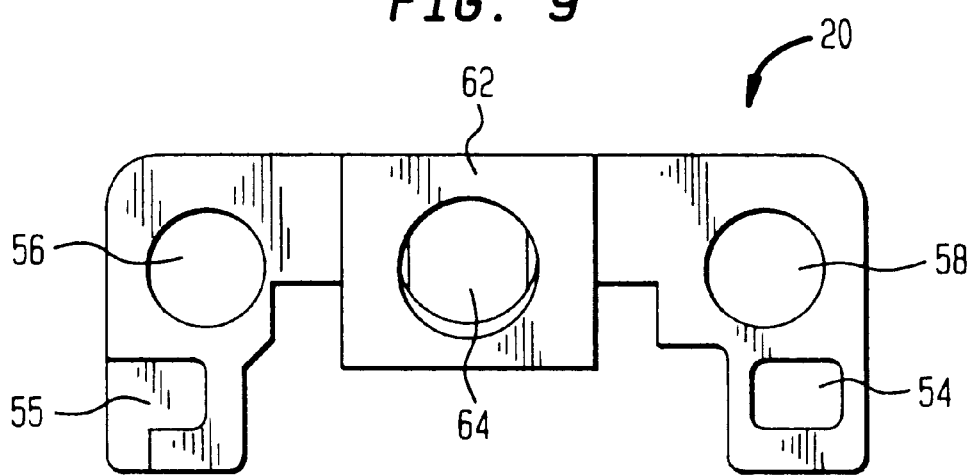
FIG. 9 is a front elevational view of the wire retainer of FIG. 8.

Wire retainer 20 which is illustrated in FIGS. 8 and 9 is provided with an internal passageway 54 which is shaped as a generally rectangular or elliptical passageway extending through the width of the wire retainer. Pin 38 is passed through internal passageway 54 to fasten wire retainer 20 to open end 23 of framework 18. So constructed, internal passageway 54 allows off axis movement of wire retainer 20 with respect to framework 18. This off axis movement allows wire retainer 20 to be moved from its open position (FIG. 1B & FIG. 20(A & B)) into a generally closed position (FIG. 1A & FIG. 21(A & B)) in which the wire retainer may also be moved laterally so that each of lugs 39 is captured within lug receiving slots 55 (FIG. 9) formed one each on each side of wire retainer 20 (FIG. 9) at the end thereof opposite internal passageway 54 (FIG. 22(A & B)). Although one of lug receiving slots 55 is illustrated in FIG. 9, the body of wire retainer 20 is symmetrical in shape, and thus a second generally opposed lug receiving slot 55 is provided on wire retainer 20, although not illustrated herein. Note that each of the receiving slots 55 is of a site to allow the retainer 20 to move pivotally with respect to the framework 18 (FIGS. 3 & 5) when the lugs 39 (FIGS. 3, 4 & 20 (A&B)–22(A&B) are received with the slots 55 receiving (FIG. 9).

Wire retainer 20 has a first ground wire opening 56 and a second ground wire opening 58. Ground wire openings 56 and 58 are so positioned so as to be in substantial register with ground wire openings 40 and 42, as well as ground wire openings 40' and 42', formed in framework 18, when the wire retainer is moved into its closed position, as shown in FIG. 1.

Wire retainer 20 also includes a threaded clamping screw opening 59. Opening 59 is threaded so that clamping screw 21 (FIGS. 1A & 23) may be threadably received therein and passed therethrough to bear down on clamping screw bearing pad 51 of upper grip member 19. Wire retainer 20 is also provided with two threaded set screw openings 60 (FIGS. 1A & 23), each opening being shaped to receive a set screw for holding a separately provided ground wire passed into ground wire openings 56 and/or 58, respectively. Due to the unique construction of universal ground assembly 5, set screws are not necessarily required. However, in those instances where there may be some difficulty in holding a ground wire within wire retainer 20 prior to clamping optical fiber cable 7 within the grounding block, set screws can be used to lock or hold the ground wire in position.

As best shown in FIGS. 1 and 8, wire retainer 20 is provided with a strength element lug 62 which protrudes from one side of the wire retainer. Lug 62 has an elongated slot 63 defined therein and passing therethrough, and a set screw opening 64 defined within slot 63 for securing each of strength elements 15 from optical fiber cable 7 to wire retainer 20.

Figure 23:
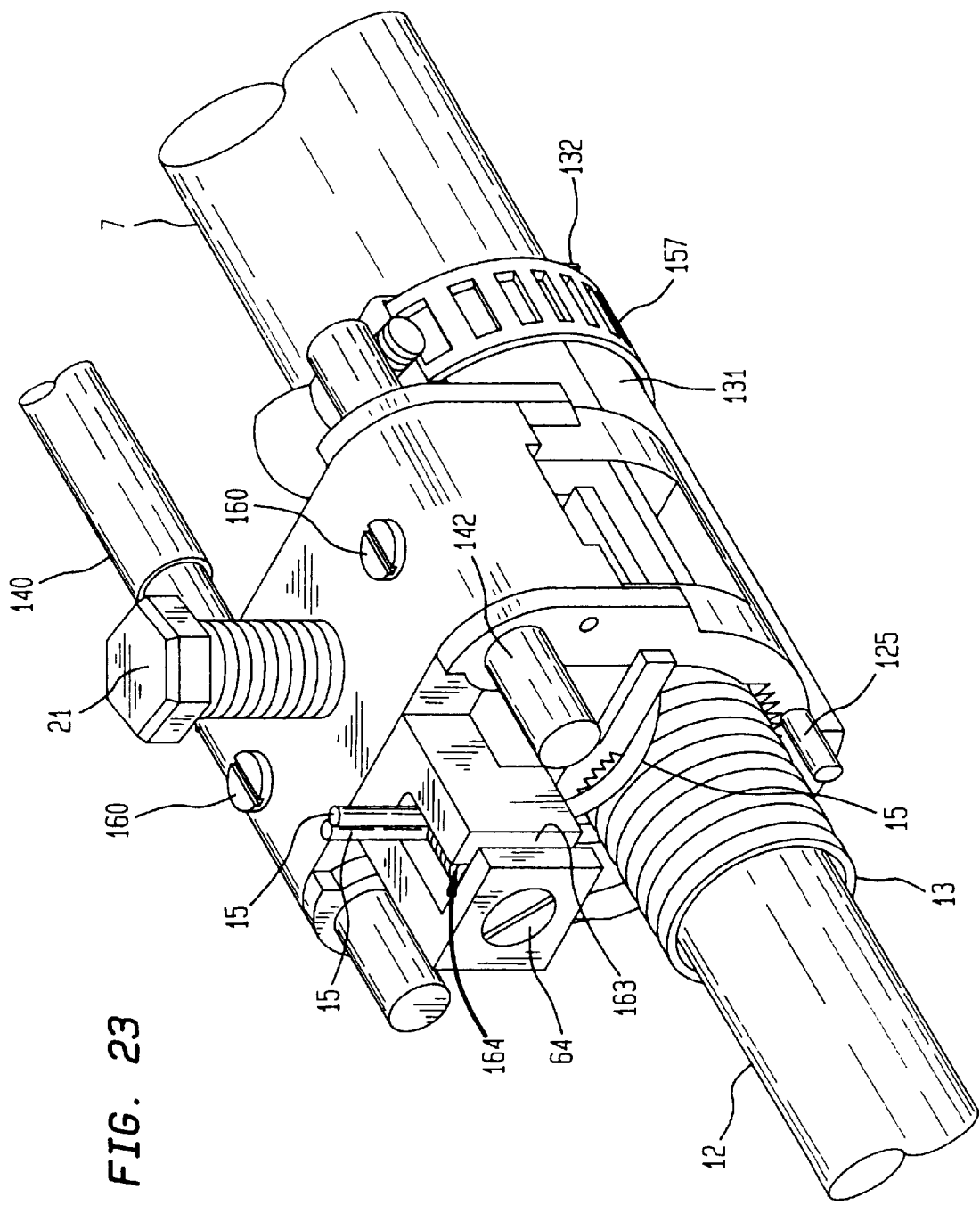
FIG. 23 is a side perspective view of the universal ground assembly of FIG. 17A, with a grounding wire, and an armored optical fiber cable with an support wires inserted in the universal ground assembly.

Thus, once an optical fiber cable, or any cable having a metallic sheath and strength elements, is positioned within grounding block 17, sheath 12 will be gripped by arcuate toothed portion 44 of upper grip 19 as it is moved toward arcuate toothed portion 28 of framework 18 gripping the cable therebetween, oversheath 13 will be gripped against stepped cable grip 31 and held in position with a cable or hose clamp 157 in FIG. 23, and both of strength elements 15 will be passed through slot 63 within strength element lug 62 and secured in position by a set screw (not illustrated) threadably received within set screw opening 64. So fastened to a cable, universal ground assembly 5 ensures that all of the metallic elements of the cable are grounded. All of the elements of universal ground assembly 5 discussed above with the possible exception of pin 38, are die cast. Preferably, they will be die cast from a zinc aluminum alloy, although magnesium, aluminum, zinc or copper will suffice if a zinc aluminum alloy is otherwise found to be unsuitable over the service life of the universal ground assembly.

As provided to a cable splicer or technician, universal ground assembly 5, as illustrated in FIGS. 1A–9, will come as a generally pre-assembled unit in which wire retainer 20 will be pinned to framework 18 by pin 38, with only upper grip member 19 needing to be passed within slotted guides 35 along the framework. A separately provided cable or hose clamp 157 (FIG. 23), will be passed over the cut end of the cable before the grounding block is positioned on the cable, the grounding block being held in position by the hose clamp 157 (FIG. 23) working in conjunction with stepped cable grip 31, as discussed above. Once the grounding block is fastened to the cable 7 by the wire clamp, upper grip member 19 is passed upward along one side of framework 18, pivoted across the open end of the framework, and then passed downward along that side of the framework toward the closed side of the grounding block and into contact with sheath 12. Thereafter wire retainer 20 is pivoted from its open position, shown in FIG. 1B and FIG. 20(A & B), into its closed position, illustrated in FIG. 1A and FIG. 21(A & B), the wire retainer then being moved laterally (i.e., in a direction substantially perpendicular to the central axis of the framework 18) so that lugs 39 are captured within lug receiving slots 55 FIG. 22(A & B), whereupon clamping screw 21 is extended toward clamping screw bearing pad 51 on the upper grip member. The clamping screw is turned to drive the arcuate toothed portions of the upper grip member into electrical contact with sheath 12 of the cable. The protruding edges of strength members 15, which were cut when the cable was cut, are then bent upward approximately 90° with respect to the axial length of the cable, and are then passed one on top of the other through slot 63, so that a set screw 21 is extended into engagement with upper grip member 19, a separately provided ground wire is passed through ground wire openings 40 and/or 42, and ground wire openings 40' and/or 42', respectively, in framework 18, as well as ground wire openings 56 and/or 58, respectively, in wire retainer 20. Thereafter, once clamping screw 21 is turned, and as upper grip member 19 is driven toward the closed side of the framework, wire retainer 20 reacts in the opposite direction so that the ground wire 140 (FIG. 23) is pinched or otherwise captured between the ground wire openings in the framework and in a wire retainer.

Figures 10, 11:
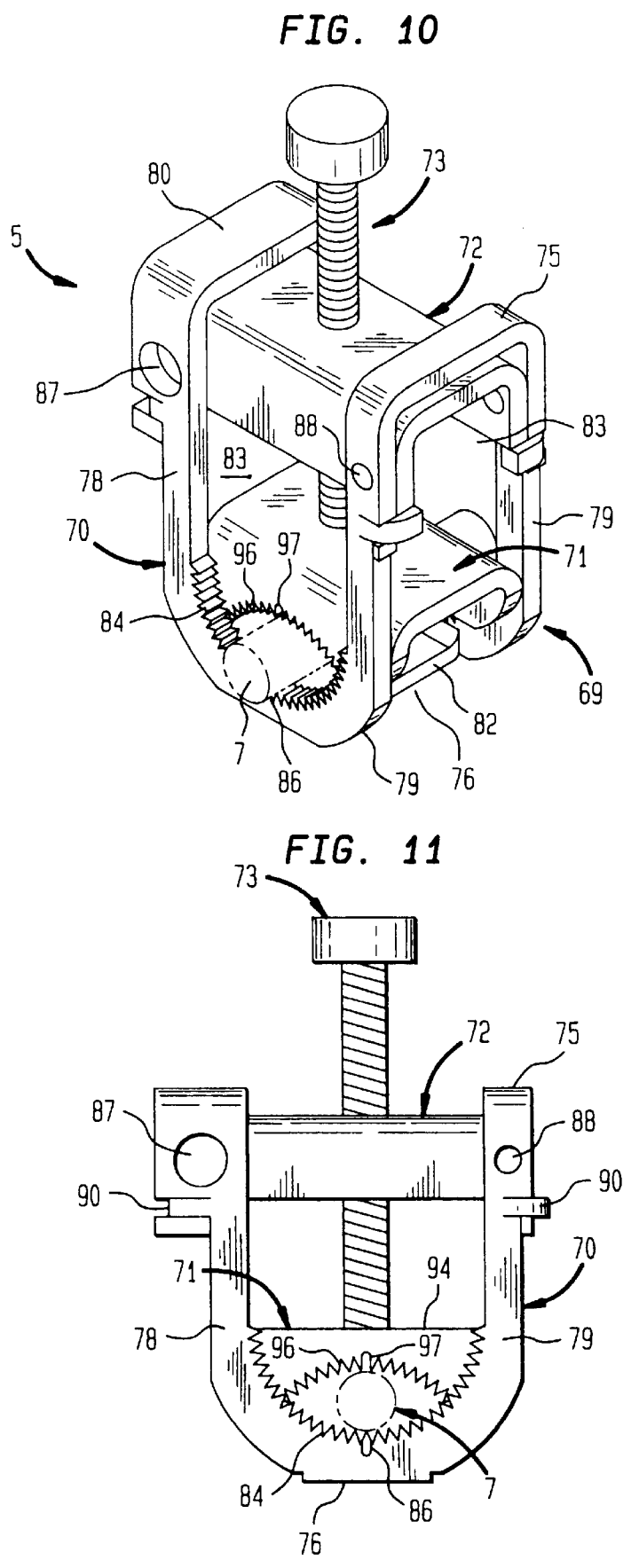

Referring now to FIGS. 10–16, a second embodiments of universal ground assembly 5 is illustrated. As shown in FIG. 10, this embodiment of universal ground assembly 5 has a grounding block 69, the grounding block having a substantially U-shape and being adapted to receive optical fiber cable 7 therein. Grounding block 69 includes a framework 70, an upper grip member 71 slidably positioned on the framework, a wire retainer 72 positioned on the framework, and a clamping screw 73 threaded through wire retainer 72 extending toward and bearing on upper grip member 71.

Referring to FIGS. 10–12, framework 70 of grounding block 69 is illustrated in greater detail. Framework 70 includes a generally open, or first, end 75 and a spaced closed, or second, end 76. Framework 70 includes a first bifurcated leg member 78 and a spaced and generally parallel second bifurcated leg member 79. The ends of each bifurcated leg member are fastened to one another at open end 75 by a pair of top cross pieces 80, and are generally extended toward one another at closed end 76 to form a bottom cross piece 82. As with the first embodiment of the invention, open end 75 and closed end 76 are adapted to receive cable 7 therein.

Still referring to FIGS. 10 and 12, framework 70 includes a pair of opposed and elongated slotted openings 83 formed by the bifurcations of each leg member intermediate open end 75 and closed end 76 of the framework. At the closed end of the framework, each leg of bifurcated leg members 78 and 79 has an arcuate toothed portion 84, the arcuate toothed portions together 84 forming a lower grip member. A single notched portion 86 is formed in arcuate toothed portion 84 on one side of framework 70, only. Aligned ground wire openings 87 and 88, and 87' and 88', are also formed in the bifurcated leg members 78, 79 in fashion similar to ground wire openings 40, 40' and 42, 42' of framework 18 (FIGS. 1 and 3).

A unique feature of the alternate embodiment of universal closure ground 5 illustrated in FIGS. 10–16 is the four notched supports 90 formed in two pairs, one pair on each of bifurcated leg members 78 and 79. Each of notched supports 90 is sized and shaped to support wire retainer 72 thereon, and is spaced from the open end of the framework. Wire retainer 72 is passed through one of elongated openings 83 and over notched supports 90, and extended across the open end 75 of framework 70 prior to threading clamping screw 73 therein, as illustrated in FIGS. 10 and 11.

Referring now to FIGS. 13 and 14, upper grip member 71 is illustrated in greater detail. Upper grip member 71 includes a first bifurcated leg 92 and a spaced and generally parallel second bifurcated leg 93 (FIG. 14). Upper grip member 71 also includes a bearing surface 94 which extends between bifurcated legs 92 and 93. Each of bifurcated legs 92 and 93 is provided with an arcuate toothed portion 96, arcuate toothed portion 96 being adapted to grip sheath 12 of cable 7. In fashion similar to framework 70, a notched opening 97 is formed in arcuate tooth portion 96 of first bifurcated leg 92 only, so that when optical fiber cable 7 is passed into grounding block 69, the strength elements 15 are received within each of notched openings 86 and 96, respectively, the strength elements then extending toward the opposite side of framework 70, butting against the inside of the framework but not extending therethrough, so that the free end of strength element 15 is captured within and between upper grip member 94 and arcuate toothed portions 84 of second end 76 of framework 70.

Wire retainer 72 is illustrated in FIGS. 15 and 16. Wire retainer 72 includes a first leg 100 and a second spaced and generally parallel leg 101. A threaded clamping screw opening 102 is formed centrally in the top surface of wire retainer 72. Axially aligned with clamping screw 102 is a threaded collar 104 which provides additional support for clamping screw 73 passed therethrough and extended toward upper grip member 71. As illustrated in FIG. 16, wire retainer 72 includes a first ground wire opening 105 and a second ground wire opening 106, ground wire openings 105 and 106 being adapted to be in substantial registry with ground wire openings 87, 87' and 88, 88' of framework 70 once wire retainer 72 is positioned therein atop notched supports 90.

In operation, the universal closure ground illustrated in FIGS. 10–16 will have an optical fiber cable 7 passed into the grounding block 69 resting on closed end 76 of framework 70, the previously stripped cable being received between arcuate toothed portions 84 of bifurcated leg members 78 and 79, and arcuate toothed portion 96 of upper grip member 71. The strength elements 15 of the cable are received within notched openings 86 and 97, respectively. Wire retainer 72 is passed through one of slotted openings 83 over notched supports 90 to generally close the open end of the framework, at which time clamping screw 73 is threaded through clamping screw opening 102 and extended toward bearing surface 94 of upper grip member 71, driving upper grip member 71 toward the closed end of the framework, and into engagement with sheath 11 received therein.

Universal ground assembly 5 as illustrated in FIGS. 10–16 is intended for use with an optical fiber cable which does not have oversheath 13. However, it is anticipated that the universal ground assembly of FIGS. 10–16 may still be used with an oversheath cable. In this event a first universal ground assembly will be fastened to oversheath 13, and a second universal ground assembly will be fastened to sheath 11. The two universal ground assemblies will then be connected one another by a short piece of ground wire passed through one of ground wire openings 87 or 88, respectively, thus ensuring the grounding of the cable.

Figure 17A:
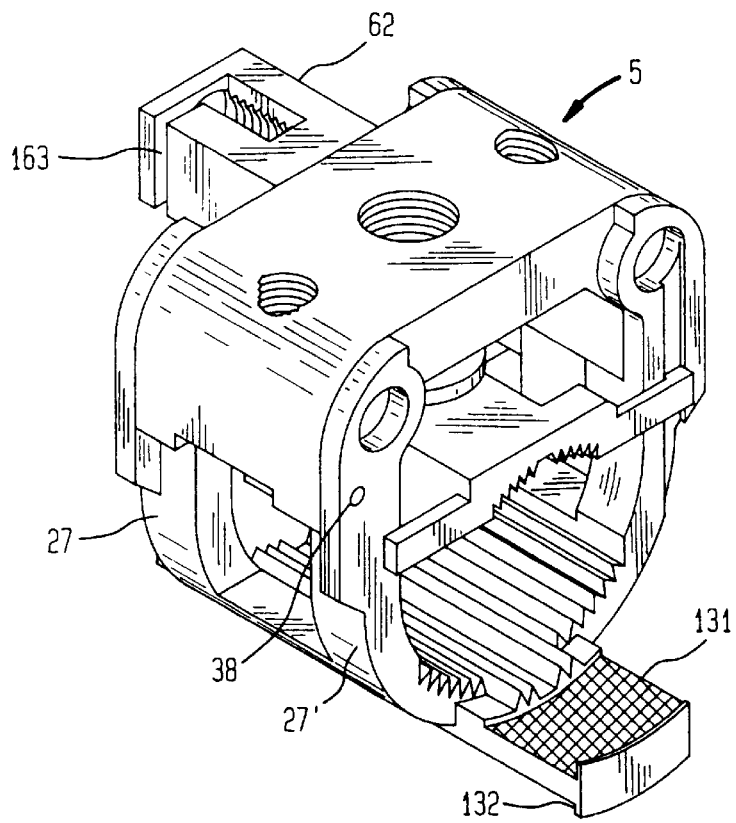
FIG. 17A is a perspective view of a third embodiment of the U-Shaped universal ground assembly with oversheath protection, showing the "L" shaped wire retainer in its closed position.
Figure 17B:
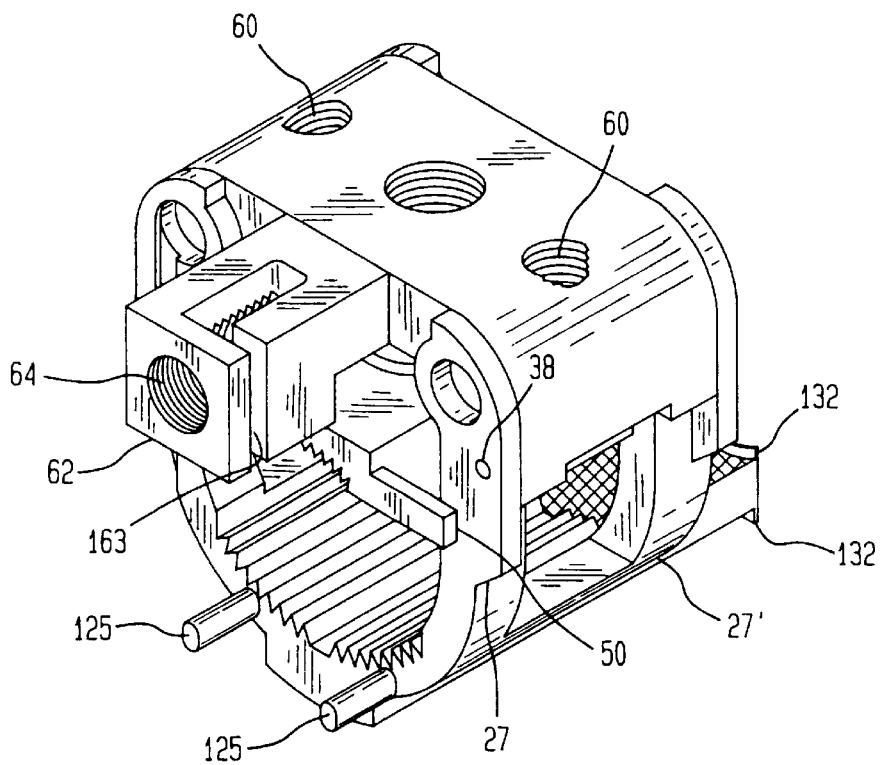
FIG. 17B is a side perspective view of the universal ground assembly of FIG. 17A, with the "L" shaped wire retainer shown in the closed position.
Figure 18A:
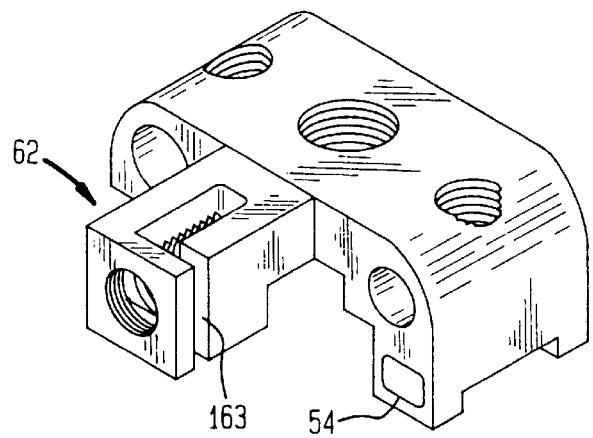
FIG. 18(A–C) are perspective top and bottom views of the wire retainer of the universal ground assembly with the "L" shaped wire retainer illustrated in FIG. 17(A & B).
Figure 18B:
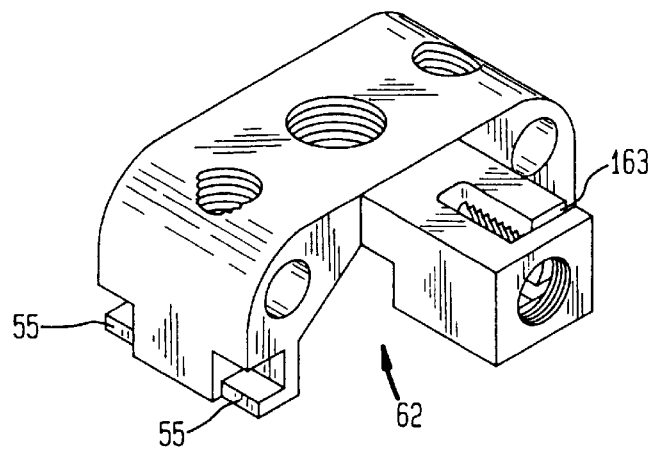
Figure 18C:
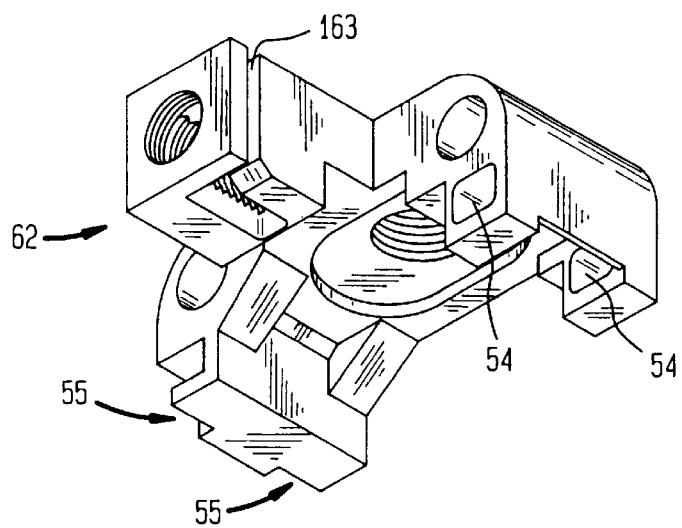
Figure 19:
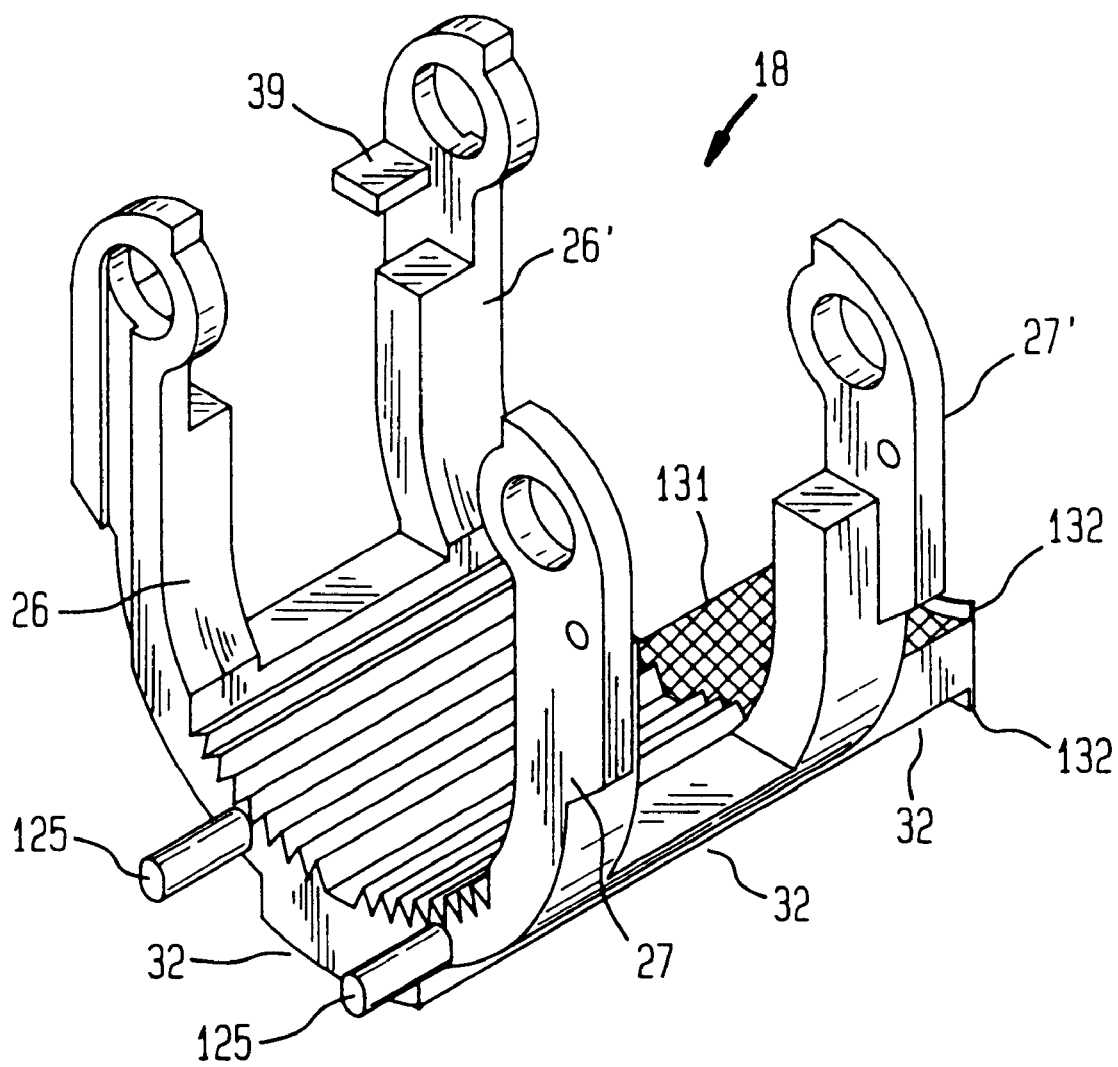
FIG. 19 is a perspective view of the grounding block of the universal ground assembly illustrated in FIG. 17(A & B) with the support wire wrap posts.

Referring now to FIGS. 17–23, a third embodiment of universal ground assembly 5 is illustrated. As discussed hereinbefore, the third embodiment of this invention is substantially similar to the first embodiment of this invention, with a few structural additions. As shown in FIGS. 17(A & B) and FIG. 19, the closed end of the U-shaped member framework has an overhanging knurled tongue portion 131 with a ridge 132 extending above and below the knurled tongue portion 131 to act as a clamp stop. The knurling of the tongue portion 131 provides an abrasive surface to assist in gripping the cable 7 (FIG. 23). The knurling of the tongue portion 131 being easier to manufacture using die cast methods than the stepped cable grip 31, of the first embodiment of this invention. As best shown in FIG. 19, knurled tongue portion is formed as a part of a reinforcing ridge 32 which extends along the length of U-shaped member framework 18, and adds additional structural rigidity to the framework.

Referring to FIG. 18(A–C), illustrated are perspective top and bottom views of the wire retainer 20 of the universal ground assembly with a strength element lug 62 having a "L" shaped support member slot 163. The "L" shaped support member slot allows for inserting a support member 15 (FIG. 23) into the "L" shaped slot and by moving the support member 15 (FIG. 23) to the back of the slot to inhibit movement of the support member 15, while tightening the set screw 164. When the strength member(s) 15 is inserted in the slot opening 163, the action of a set screw 164 (FIG. 1 & FIG. 23) pinches the strength member(s) 15 (FIG. 23) into contact with the back of the slot 163 and retaining the strength member(s) 15 (FIG. 23) to the assembly.

Referring to FIGS. 18(B & C), both of the lug receiving slots 55 of the wire retainer 20, are illustrated in the perspective top and bottom views.

Referring now to FIG. 19, on the side opposite the overhanging knurled tongue portion 131 and approximately centrally located in the toothed arcuate section are at least one longitudinally extended post 125 (i.e. strength member wrap post(s)), for receiving a strength member(s) 15 of the cable, as described hereinbefore. If the strength member(s) 15 are in the 12:00 and 6:00 o'clock positions, then the strength member at the 6:00 o'clock position is bent around one of the longitudinally notches 125 (i.e. strength member (s) wrap posts), before being brought up into the "L" shaped slot opening 163 (not shown).

Figure 20A:
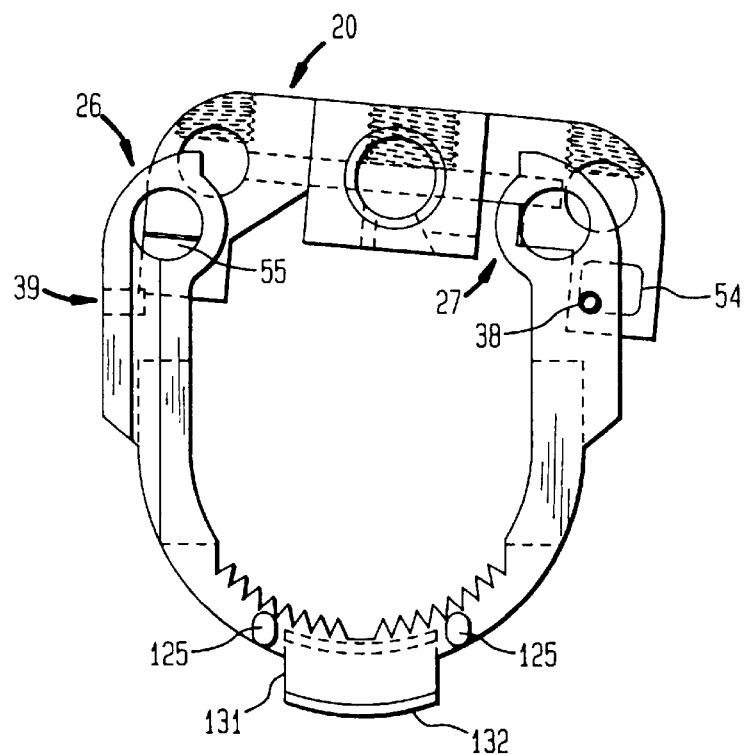
FIG. 20(A & B) are a side and perspective view of the grounding block and wire retainer, illustrated in FIG. 17(A & B), showing the wire retainer in a general open position and unlocked position.
Figure 20B:
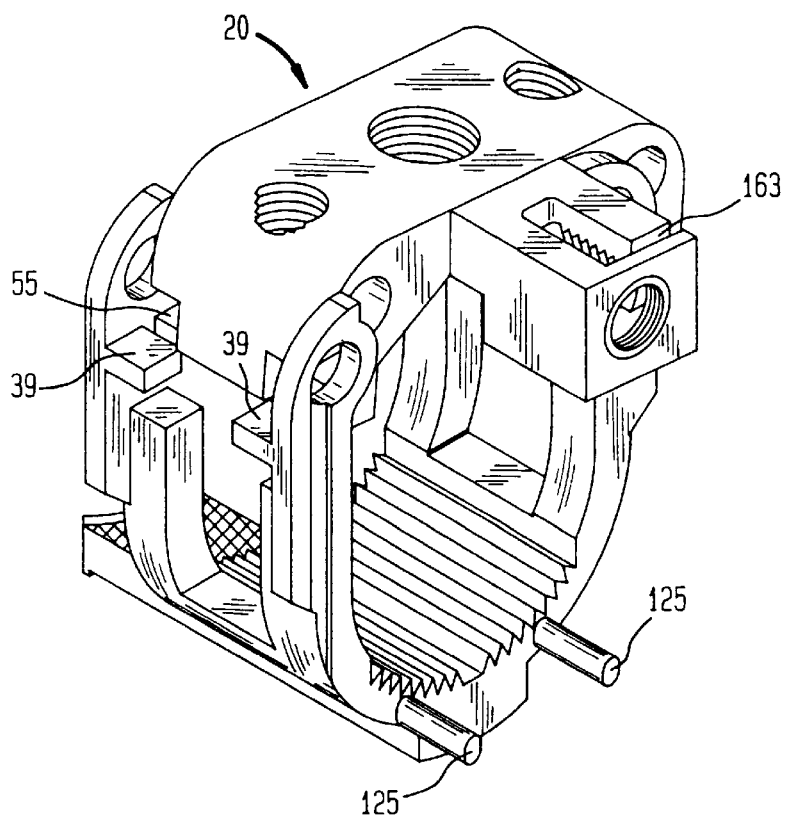
Figure 21A:
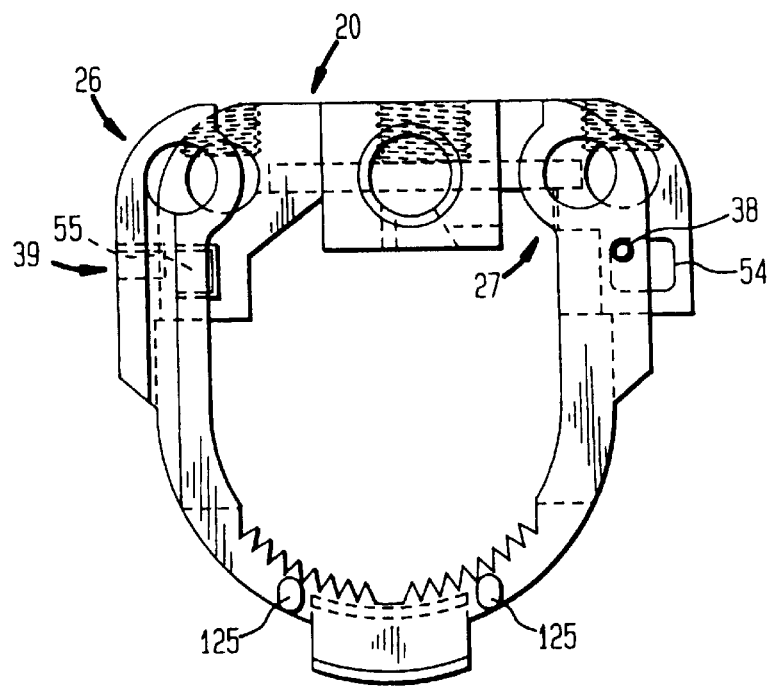
FIG. 21(A & B) are a side and perspective view of the grounding block and wire retainer, illustrated in FIG. 17(A & B), showing the wire retainer in a general closed and unlocked position.
Figure 21B:
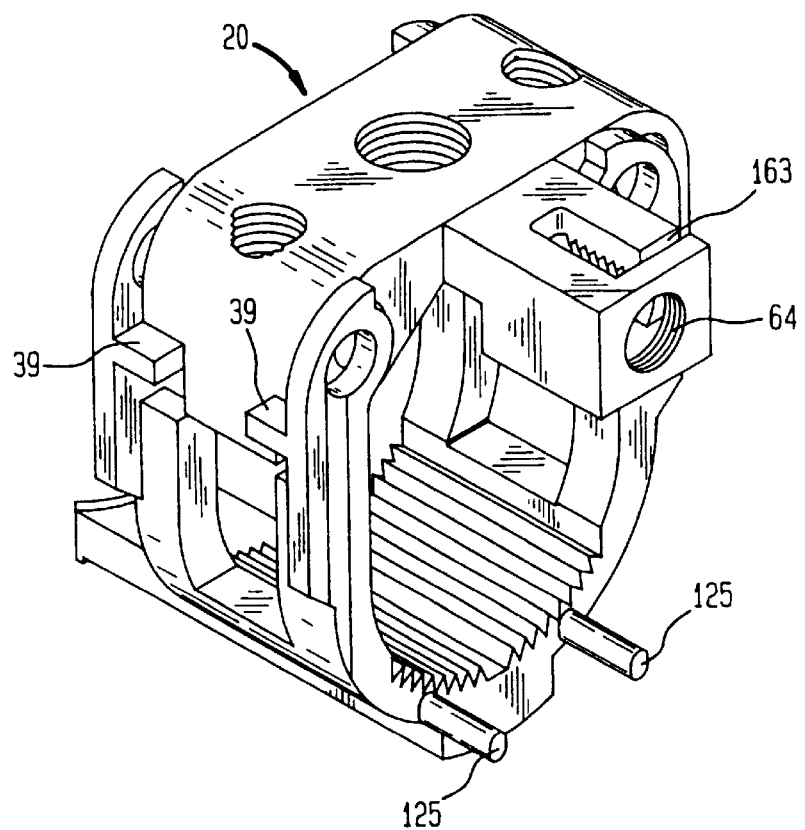
Figure 22A:
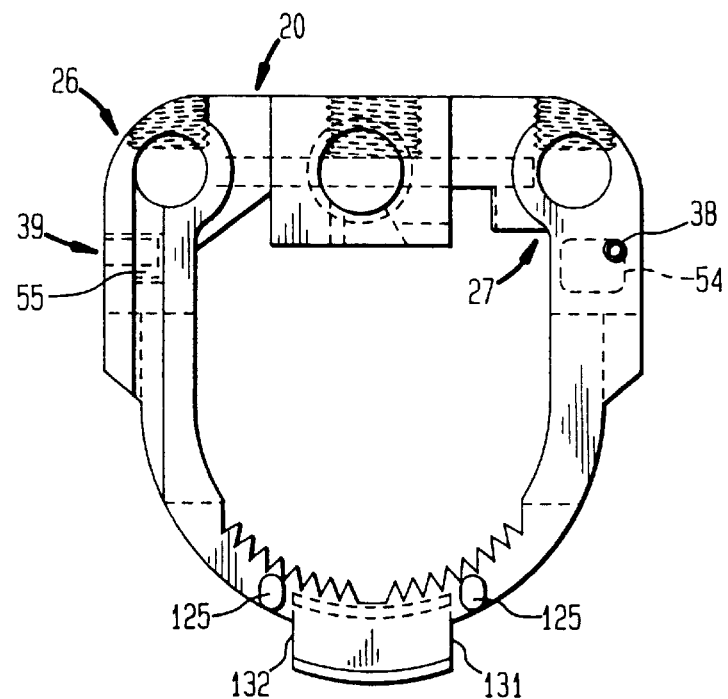
FIG. 22(A & B) are a side and perspective view of the grounding block and wire retainer, illustrated in FIG. 17(A & B), showing the wire retainer in a general closed and locked position.
Figure 22B:
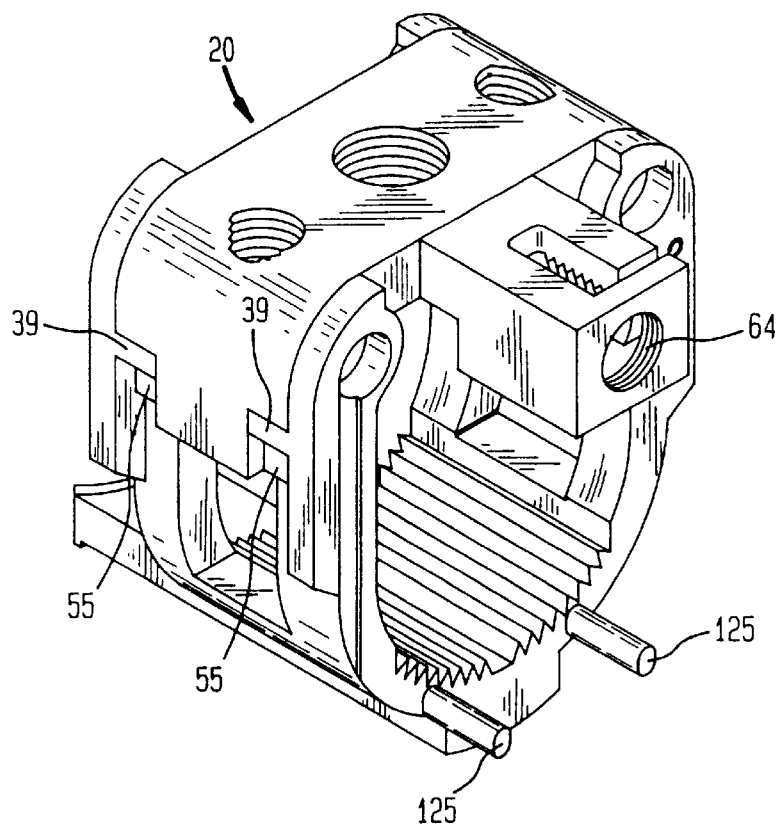

Referring to FIG. 20(A & B) through FIG. 22(A & B), the side and perspective views of wire retainer 20 are illustrated as wire retainer 20 is pivoted from its open position, shown in FIG. 20(A & B), into its closed position, illustrated in FIG. 21(A & B), the wire retainer 20 then being moved laterally (i.e., in a direction substantially perpendicular to the central axis of the framework 18) so that lugs 39 are captured within lug receiving slots 55 FIG. 22(A & B).

Referring to FIG. 23, illustrated is the optical fiber cable 7 inserted in the universal ground assembly 5. A separately provided cable or hose clamp 157 will be passed over the cut end of the cable 7 before the grounding block is positioned on the cable, the grounding block being held in position by the hose clamp 157 working in conjunction with the overhanging knurled tongue portion 131 with the clamp stop ridge 132.

A separately provided ground wire 140 is passed through ground wire openings 40 and/or 42, and ground wire openings 40' and/or 42', respectively, in framework, as well as ground wire openings 56 and/or 58, respectively, in wire retainer 20. A separately provided wire 142 maybe passed through the unused ground wire openings 40 and/or 42, and unused ground wire openings 40' and/or 42', respectively, in framework, as well as unused ground wire openings 56 and/or 58, respectively, in wire retainer 20 to provide support for the universal ground assembly 5 when clamping screw 21 is tightened. Wire retainer 20 is also provided with two threaded set screw openings, each opening being shaped to receive a set screw 160 for holding the separately provided ground and support wires passed into ground wire openings 56 and/or 58, respectively.

Support members 15 are inserted into and moved to the back of the "L" shaped support member slot. By utilizing the set screw opening 64, set screw 164 is tightened to firmly secure the support members to the universal ground assembly 5.

While the principles and features of the invention have been illustrated in connection with its use on optical cables, the grounding assembly may be used with other types of cables or members that need to be grounded. Accordingly, changes, alterations, or adaptations may occur to workers in the art without departure from the spirit and scope of the invention.

We claim:

1. A grounding device for use with a cable having an exterior jacket and at least one grounding wire, comprising:
   a grounding block having first grip means for receiving the cable to be grounded therein, wherein said grounding block comprises a framework having a generally U-shaped portion with a generally open side and an opposed closed side and a wire retainer movably attached to said U-shaped portion, said wire retainer including first grounding means opening for receiving a first grounding wire of the cable and said U-shaped portion including second grounding means opening for receiving the first grounding wire;
   clamping means for clamping the cable to the grounding block comprising second grip means movably mounted on said grounding block for movement toward and away from said first grip means;
   third grip means attached to said grounding block for gripping the exterior jacket of the cable;
   actuating means on said grounding block for moving said second grip means toward said first grip means for clamping the cable between said first and second grip means, and for securing the first grounding wire between said first grounding means opening and said second grounding means opening; and
   connecting means for connecting said wire retainer to said framework and allowing movement of said wire retainer toward and away from said U-shaped portion.

2. The device of claim 1, wherein said framework comprises
   a first bifurcated leg member and a second bifurcated leg member, each said bifurcated leg member being spaced apart from and generally parallel to the other bifurcated leg member and having a first and a second leg separated by the bifurcation.

3. The device of claim 2, wherein said framework has a first end and a spaced second end, and an axial length extending from said first end to said second end parallel to that portion of the cable clamped within the grounding block.

4. The device claim 3, wherein said first grip means comprises
   an arcuate toothed portion formed at said closed side of the framework and for gripping the cable, said toothed portion generally extending along the axial length of said framework from said first end to said second end and including a notched portion formed therein and generally extending along the axial length of the framework.

5. The device of claim 4, wherein said second grip means comprises
   an arcuate toothed portion for gripping the cable and generally extending along the axial length of said framework between said first and second ends, said second grip means including a notched portion generally extending along the axial length of said framework.

6. The device of claim 3, wherein both of said bifurcated leg members includes an arcuate toothed portion at the closed side of the framework, each of said arcuate toothed portions together forming said first grip means.

7. The device of claim 6, wherein said second grip means comprises
   at least one bifurcated leg second grip member for gripping the cable.

8. The device of claim 6, wherein said second grip means comprises
   a first bifurcated leg second grip member and a spaced second bifurcated leg second grip member, each of said bifurcated leg second grip members having a first leg and a second leg separated by the bifurcation, each of said bifurcated leg second grip members separate and generally arcuate toothed portions gripping the cable, and wherein said first bifurcated leg second grip member includes a notched portion formed therein between the first leg and second leg thereof.

9. The device of claim 2, wherein said framework further comprises
   guide means for guiding said second grip means toward and away from said first grip means.

10. The device of claim 2, wherein said actuating means comprises:
    clamping screw means threadably received within said wire retainer and extending therethrough, said clamping screw means bearing on said second grip means for moving said second grip means toward said first grip means and into engagement with the cable received within the grounding block.

11. The device of claim 10, wherein said ground wire is clamped between said first and second grounding means as said second grip means is moved into engagement with the cable received within said grounding block.

12. The device of claim 1, wherein said second grounding means opening includes at least one bore defined within said grounding block and extending therethrough; wherein said first grounding means opening includes at least a second bore defined within said wire retainer and extending therethrough, said second bore being in substantial register with said first bore; and wherein said second bore is moved out of register with said first bore when said actuating means moves said second grip means into engagement with the cable received within the grounding block.

13. The device of claim 1, wherein said third grip means included a toothed portion.

14. The device of claim 1, wherein said wire retainer further comprises fourth grip means attached to said wire retainer for gripping a cable strength element of said cable.

15. The device of claim 14, wherein said fourth grip means includes a slot and a set screw for gripping said cable strength element.

16. The device of claim 15, wherein said slot is "L" shaped.

17. The device of claim 1, wherein said third grip means included a knurled portion.

18. A grounding device for use with a cable having an exterior jacket and at least one grounding wire, comprising;
    a substantially U-shaped grounding block for receiving the cable therein, said grounding block defining a generally open side and an opposed closed side, wherein said grounding block includes a framework having a first bifurcated leg member and a second bifurcated leg member, each of said bifurcated leg members being spaced apart from and generally parallel to one another, said framework including a first grounding means opening for receiving a grounding wire of the cable;
    first grip means formed at the closed end of said framework for clamping the cable within said grounding block;
    second grip means movably positioned on the grounding block with respect to said first grip means;
    third grip means attached to said U-shaped ground block at said closed end for gripping the exterior jacket of the cable;

a second grounding means opening attached to said grounding block for clamping a grounding wire to the cable for establishing an electrical connection; and means on said grounding block for moving said second grip means toward and away from said first grip means for clamping said grounding block to the cable, and for substantially simultaneously actuating said second grounding means opening so as to clamp the grounding wire between said first grounding means opening and said second grounding means opening.

19. A grounding device for use with a cable, comprising:

a substantially U-shaped grounding block for receiving the cable therein, said grounding block defining a generally open side and an opposed closed side;

wherein said U-shaped grounding block comprises a framework having a first bifurcated leg member and a second bifurcated leg member, each of said bifurcated leg members being spaced apart from and generally parallel to one another and including a first leg and a second leg formed between each of the bifurcations, said each of said bifurcated leg members include a grounding means opening for clamping a grounding wire to the cable for establishing an electrical connection;

first grip means formed by the first and second leg of each of said leg members at the closed side of said U-shaped grounding block, said first grip means being adapted to grip the cable received within said U-shaped grounding block;

second grip means movably positioned on said U-shaped grounding block with respect to said first grip means;

third grip means attached to said U-shaped ground block at said closed end for gripping the exterior jacket of the cable; and means on said U-shaped grounding block for moving said first grip means toward and away from said second grip means for clamping the cable to the U-shaped grounding block, and for substantially simultaneously actuating said grounding means opening so as to clamp the grounding wire.

20. The device of claim 19, wherein said third grip means includes a toothed portion.

* * * * *